(12) United States Patent
Flanders et al.

(10) Patent No.: US 6,341,039 B1
(45) Date of Patent: Jan. 22, 2002

(54) FLEXIBLE MEMBRANE FOR TUNABLE FABRY-PEROT FILTER

(75) Inventors: Dale C. Flanders; Peter S. Whitney, both of Lexington, MA (US); Michael F. Miller, Hollis, NH (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/648,060

(22) Filed: Aug. 25, 2000

Related U.S. Application Data

(60) Provisional application No. 60/186,780, filed on Mar. 3, 2000.

(51) Int. Cl.$^7$ .......................... G02B 27/00; G02B 26/00
(52) U.S. Cl. ................. 359/578; 359/577; 359/291; 359/846
(58) Field of Search ................. 359/290, 291, 359/577, 578, 846

(56) References Cited

U.S. PATENT DOCUMENTS

| | | | |
|---|---|---|---|
| 4,859,060 A | 8/1989 | Katagiri et al. | 356/352 |
| 5,291,502 A | 3/1994 | Pezeshki et al. | 372/20 |
| 5,561,523 A | 10/1996 | Blomberg et al. | 356/352 |
| 5,629,951 A | * 5/1997 | Chang-Hasnain et al. | 372/20 |
| 5,673,139 A | * 9/1997 | Johnson | 359/846 |
| 5,739,945 A | 4/1998 | Tayebati | 359/291 |
| 5,835,216 A | 11/1998 | Koskinen | 356/352 |
| 5,986,796 A | * 11/1999 | Miles | 359/260 |
| 6,078,395 A | 6/2000 | Jourdain et al. | 356/352 |
| 6,275,324 B1 | * 8/2001 | Sneh | 359/291 |

FOREIGN PATENT DOCUMENTS

| | | | |
|---|---|---|---|
| WO | WO99/34484 | 7/1999 | G01B/9/02 |
| WO | WO 99/52006 | * 10/1999 | |

OTHER PUBLICATIONS

D. Vakhshoori, et al., "2mW CW singlemode operation of a tunable 1550 nm vertical cavity surface emitting laser with 50 nm tuning range", Electronics Letters vol. 35, No. 11, pp. 1–2, May 27, 1999.*

Aratani, K., et al., "Surface Micromachined Tuneable Interferometer Array," Sensors Miniaturised Infrared and Actuators A, 43 (1994), pp. 17–23.

Blomberg, Martti, et al., "A Silicon Microsystem– Miniaturised Infrared Spectrometer," 1997 International Conference on Solid–State Sensors and Actuators, Chicago, Jun. 16–19, 1997. pp. 1257–1258.

(List continued on next page.)

*Primary Examiner*—Cassandra Spyrou
*Assistant Examiner*—John Juba, Jr.
(74) *Attorney, Agent, or Firm*—Mills & Onello LLP

(57) ABSTRACT

A tunable Fabry-Perot filter includes an optical cavity bounded by a stationary reflector and a deformable or movable membrane reflector. A second electrostatic cavity outside of the optical cavity includes a pair of electrodes, one of which is mechanically coupled to the movable membrane reflector. A voltage applied to the electrodes across the electrostatic cavity causes deflection of the membrane, thereby changing the length of the optical cavity and tuning the filter. The filter with the movable membrane can be formed by micro device photolithographic and fabrication processes from a semiconductor material in an integrated device structure. The membrane can include an inner movable membrane portion connected within an outer body portion by a pattern of tethers. The tether pattern can be such that straight or radial tethers connect the inner membrane with the outer body. Alternatively, a tether pattern with tethers arranged in a substantially spiral pattern can be used.

16 Claims, 17 Drawing Sheets

OTHER PUBLICATIONS

Jerman, J.H., "The Fabrication and Use of Micromachined Corrugated Silicon Diaphragms," Sensors and Actuators, A21–A23, (1990), pp. 988–992.

Jerman, J.H., et al., "Miniature Fabry–Perot Interferometers Micromachined in Silicon for Use in Optical Fiber WDM Systems," 1991 IEEE. Transducers '91 Conf pp. 372–375.

Jerman, J.H., et al., "A Miniature Fabry–Perot Interferometer with a Corrugated Silicon Diaphragm Support," Sensors and Actuators A, 29 (1991), pp. 151–158.

Keranen, Kimmo, et al., "Electrically Tuneable NIR–Spectometer," SPIE, vol. 3099, pp. 181–184. (1997).

Klemic, James F., et al., "Fabrication Issues in Micromachined Tunable Optical Filters," SPIE, vol. 2639, pp. 89–100. (1995).

Larson, M.C., et al., "Vertical Coupled–Cavity Microinterferometer on GaAs with Deformable–Membrane Top Mirror," IEEE Photonics Technology Letters, vol. 7, No. 4, Apr. 1995. pp. 382–384.

Lissberger, P.H., et al., "Narrowband Position–Tuned Multilayer Interference Filter for Use in Single–Mode–Fibre Systems," Electronics Letters, vol. 21, No. 18, pp. 798–799.

Mallinson, S.R., "Crosstalk Limits of Fabry–Perot Demultiplexers," Electronics Letters, vol. 21, No. 17 Aug. 15, 1985 pp. 759–761.

Mallinson, S.R., et al., "Minature Micromachined Fabry–Perot Interferometers in Silicon," Electronics Letters, vol. 23, NO. 20. Sep. 24, 1987 pp. 1041–1043.

Mallinson, Stephen R., "Wavelength–Selective Filters for Single–Mode Fibre WDM Systems Using Fabry–Perot Interferometers," Applied Optics, vol. 26, No. 3, Feb. 1, 1987, pp. 430–436.

Peerlings, J., et al., "Long Resonator Micromachined Tunable GaAs–AlAs Fabry–Perot Filter", IEEE Photonics Technology Letters, vol. 9, No. 9, Sep. 1997.

Rossberg, Dirk, "Optical Properties of the Integrated Infrared Sensor," Sensors and Actuators A 54 (1996), pp. 793–797.

Rossberg, D., "Silicon Micromachined Infrared Sensor with Tunable Wavelength Selectivity for Application in Infrared Spectroscopy," Sensors and Acutaors A 46–47, (1995), pp. 413–416.

Stone, J., et al., "Pigtailed High–Finesse Tunable Fibre Fabry–Perot Interferometers with Large, Medium and Small Free Spectral Ranges," Electronics Letters, Jul. 16, 1987, vol. 23, No. 15.

Tayebati, P., et al., "Microelectromachanical Tunable Filter with Stable Half Symmetric Cavity," Electronics Letters, Oct. 1, 1998, vol. 34, No. 20.

Tayebati, P., et al., "Widely Tunable Fabry–Perot Filter Using Ga(Al) As–A$10_x$ Deformable Mirrors," IEEE Photonics Technology Letters, vol. 10, No. 3, Mar. 1998. pp. 394–396.

Tran, A., "Micromachined Micro–Optic Devices," IEEE, LEOS Newsletter, Apr. 1996. pp. 10–12.

Tran, A., et al., "Surface Micromachined Fabry–Perot Tunable Filter," IEEE Photonics Technology Letters, vol. 8, No. 3, Mar. 1996, pp. 393–395.

Vail, E.C., et al., "GaAs Micromachined Widely Tunable Fabry–Perot Filters," Electronics Letters, Feb. 2, 1995, vol. 31, No. 3. pp. 228–229.

Viitasalo, M., et al., "Carbon Dioxide Sensor Based on Micromachined Fabry–Perot Interferometer," Sensor 97 Kogressband III, poster A7.36, pp. 193–198.

Walker, James A., et al., "Fabrication of a Mechanical Antireflection Switch for Fiber–to–the–Home Systems," Journal of Microelectromechanical Systems, vol. 5, No. 1, Mar. 1996, pp. 45–51.

Wu, M.S., et al., "Widely and Continuously Tunable Micromachine Resonant Cavity Detector with Wavelength Tracking," IEEE Photonics Technology Letter, vol. 8, No. 1, Jan. 1996.

"Fabricating Small Apertures in Silicon–on–Insulator Wafers," Photonics Tech Briefs, Mar. 2000, p. 31a.

MEM–Tune Tunable Filter, Preliminary Data Sheet DS00553, May 2000, CoreTek, Inc., 299 Ballardvale Street, Wilimington, MA 01887.

"Micromachined Opto/Electro/Machanical Systems," NASA Tech Briefs, Mar. 1997, pp. 50–52, 111–112.

OPM–1 Optical Performance Monitor, Preliminary Data Sheet, DS00555, May 2000, CoreTek, Inc., 299 Ballardvale Street, Wilmington, MA 01887.

* cited by examiner

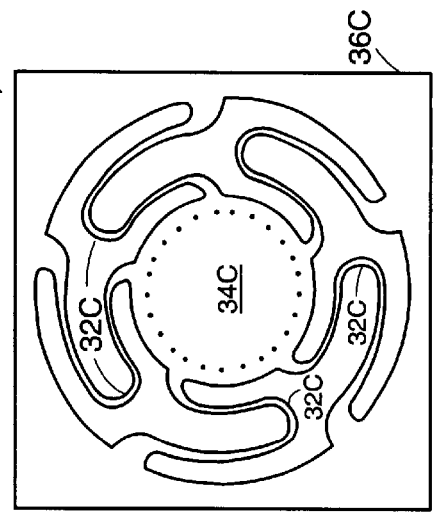
FIG. 3A HEXAGON
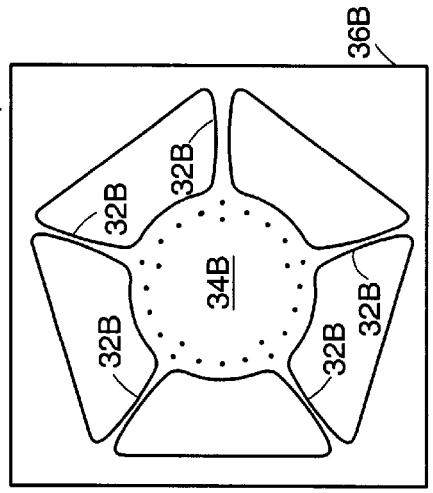
FIG. 3B PENTAGON
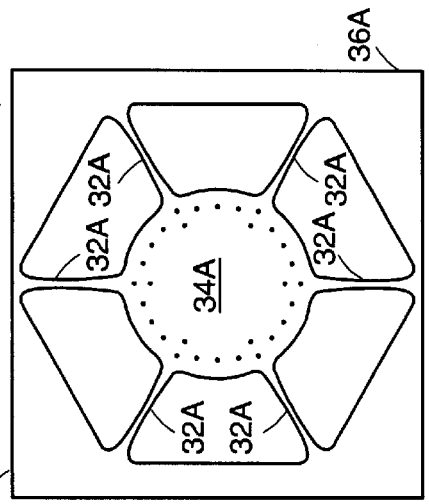
FIG. 3C LOOP
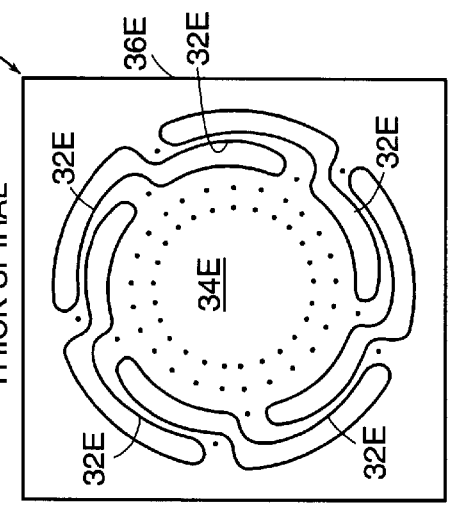
FIG. 3E THICK SPIRAL
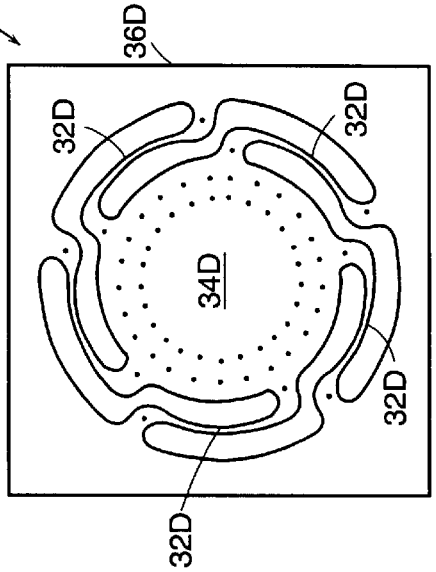
FIG. 3D THIN SPIRAL

FLEXIBLE MEMBRANE FOR TUNABLE FABRY-PEROT FILTER

RELATED APPLICATION

This application is based on U. S. Provisional Patent application Ser. No. 60/186,780, filed on Mar. 3, 2000.

BACKGROUND OF THE INVENTION

A Fabry-Perot filter (FPF) is an optical device which is constructed to pass light of a selected band of wavelengths. Light entering the filter enters a cavity which is bounded by a pair of reflective surfaces. The reflective surfaces are separated by a precisely controlled distance which determines a set of passbands for the filter. The smaller the separation, the further apart the passbands are in wavelength. That is, the smaller the separation, the larger the free spectral range (FSR) of the filter.

A tunable FPF adds an adjustable component to the separation by which the peak wavelengths of the passbands can be changed. Typically, tuning is achieved in a miniature FPF by making one of the two reflectors a movable or deformable membrane and applying a voltage between the membrane and the second fixed reflector, thereby changing the cavity separation distance through electrostatic attraction. In such a device, the amount of deflection and, therefore, cavity length control, is dependent upon the distance between the reflectors and the level of the applied voltage. For a given starting separation, more deflection requires a higher voltage level; and, likewise, for a given voltage range, more deflection requires that the reflectors be closer together.

At voltage levels compatible with smaller miniature devices, the prior approach to tuning FPFs restricts the device to a relatively small cavity size. This constraint can greatly inhibit the performance of the device by restricting control over the wavelength passbands.

SUMMARY OF THE INVENTION

In one aspect, the present invention provides a tunable filter, which in one embodiment is a Fabry-Perot filter (FPF), and a method which overcome these drawbacks of the prior approaches. The FPF of the invention includes an input by which light enters the filter and an output by which filtered light exits the device. A first cavity, e.g., the optical cavity, is provided between the input and the output and is bounded by first and second reflective surfaces. As with the conventional prior art FPF, the wavelengths of light exiting the filter are dependent upon the length of the first cavity. In the present invention, at least one of the reflective surfaces is movable to vary the length of the first cavity to tune the device. The invention also provides a second cavity which is outside the first cavity. A voltage can be applied across the second cavity to move the movable reflective surface to change the length of the first cavity and thereby tune the filter.

In one embodiment, the electrostatic cavity has two electrodes, one fixed and one movable. The movable electrode is coupled to the movable reflective surface. The voltage is applied across the electrostatic cavity via the two electrodes to move the movable surface, thereby changing the length of the first or optical cavity on the opposite side of the movable surface to tune the filter.

One of the reflective surfaces can be curved to present a concave shape to the inside of the first (optical) cavity. The curved reflector can be produced by a mass transport (MT) process of the type described in U. S. Pat. No. 5,618,474, by Liau, et al., issued Apr. 8, 1997, entitled, "Method of Forming Curved Surfaces by Etching and Thermal Processing," the contents of which are incorporated herein in their entirety by reference. The concave mirror significantly loosens the angular alignment tolerances on the device, and the MT fabrication approach produces an extremely smooth surface, which is beneficial for high optical finesse on the micro-lens-scale concave surface.

The movable reflective surface can be formed as a movable membrane nested within an outer body. The movable membrane is connected to the outer body by a plurality of flexible tethers or flexures. The movable membrane moves axially with respect to the outer body portion via the flexing or deformation of the flexures under the electric field applied across the electrostatic cavity. The flexures are shaped and sized to provide a desired amount of deflection under expected voltage ranges and optical operational characteristics. In one particular embodiment, the flexures extend between the movable membrane and the outer body in a straight or radial pattern. In another embodiment, the flexures are formed in a substantially spiral pattern. This latter configuration provides longer flexure length and, therefore, more deflection under applied voltage, while maintaining a relatively small overall surface size.

This reflective surface with the movable membrane, outer body portion and tether pattern can be formed using semiconductor device fabrication techniques. For example, the tether, membrane and body patterns can be defined on a semiconductor layer such as a silicon wafer by photolithography. The patterns can then be formed in the semiconductor by one or more etching steps. The movable membrane can then be at least partially coated with a high reflectivity (HR) coating to provide the desired reflective characteristics for the interior of the optical cavity.

In one embodiment, the filter, e.g., FPF, of the invention is an integrated structure fabricated using semiconductor device fabrication and photolithographic techniques. In one particular embodiment, the device is formed from a silicon-on-insulator device structure.

In the integrated structure of the invention, a first reflective layer and a second reflective layer are formed spaced apart by a spacing layer interposed between them. The thickness of the spacing layer determines the distance between the reflective layers and, therefore, the length of the first, i.e., optical, cavity of the device. At least one of the reflective layers comprises the movable reflective surface noted above which makes the filter tunable. An electrode layer is disposed spaced apart from the movable reflective layer to define the second (electrostatic) cavity outside of the first (optical) cavity. The voltage is applied across the second cavity to move the movable reflective layer.

In one embodiment, the device includes a first electrode coupled to the electrode layer and a second electrode coupled to the movable reflective layer. The voltage used to move the movable layer is applied across the second cavity via the electrodes.

In one embodiment, the spacing layer includes a semiconductor layer, such as a silicon layer. The silicon layer can be sized such as by grinding and polishing to a precise thickness to control the length of the optical cavity of the device. In another embodiment, the spacing layer includes a layer of oxide grown or deposited on a semiconductor layer. The thickness of the oxide can be used to control the length of the cavity. In one embodiment, the spacing layer includes a layer of semiconductor and a layer of oxide, the thickness of either or both of which can be controlled to control the length of the cavity. In another embodiment, the spacing layer comprises a plurality of spacing posts, which can be attached to one or both of the reflective layers. The posts can be made of metal such as gold and can be plated or bonded to one or both of the reflective layers.

The tunable filter and method provide numerous advantages over the approaches of the prior art. For example, as described above, in the present invention, the optical cavity is not the same as the electrostatic cavity. Therefore, the length of the optical cavity can be defined independently of the relationship between the required membrane deflection and the applied deflection voltage. As a result, the cavity can be designed with the freedom and flexibility to meet only specific optical requirements without the electrical constraints introduced in the prior art devices. The filter's optical parameters, e.g., free spectral range, and the electrostatic tuning parameters can be independently optimized. A much more precise device with more desirable optical performance as well as more efficient electrical performance is obtained.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 3A through 3G are schematic plan views of various configurations of the movable membrane layer with different tether patterns in accordance with the invention.

DETAILED DESCRIPTION OF PREFERRED EMBODIMENTS OF THE INVENTION

Figure 1:
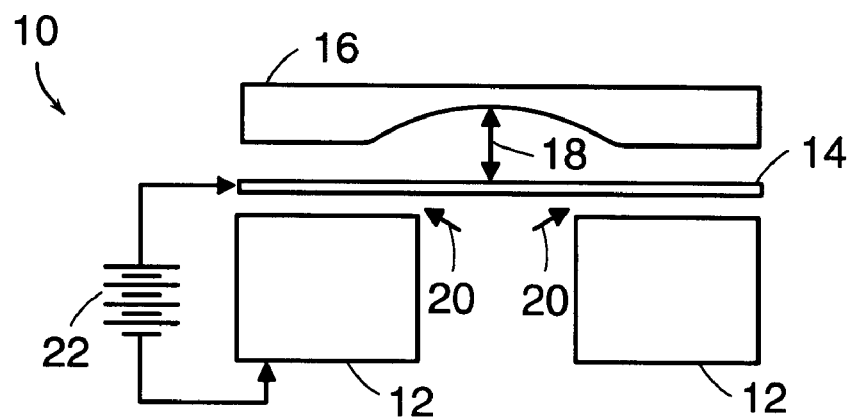
FIG. 1 contains a schematic cross-sectional diagram of one embodiment of an optical filter in accordance with the invention.

FIG. 1 contains a schematic cross-sectional view of one embodiment of a tunable Fabry-Perot filter (FPF) 10 in accordance with the invention. The filter 10 includes three main functional layers, including a tuning drive electrode 12, a moving membrane reflector 14, and a concave, e.g., spherical, cavity reflector 16. These functional layers are held together and operated as a tunable FPF with several interstitial layers, as described hereinafter in detail.

Figure 2:
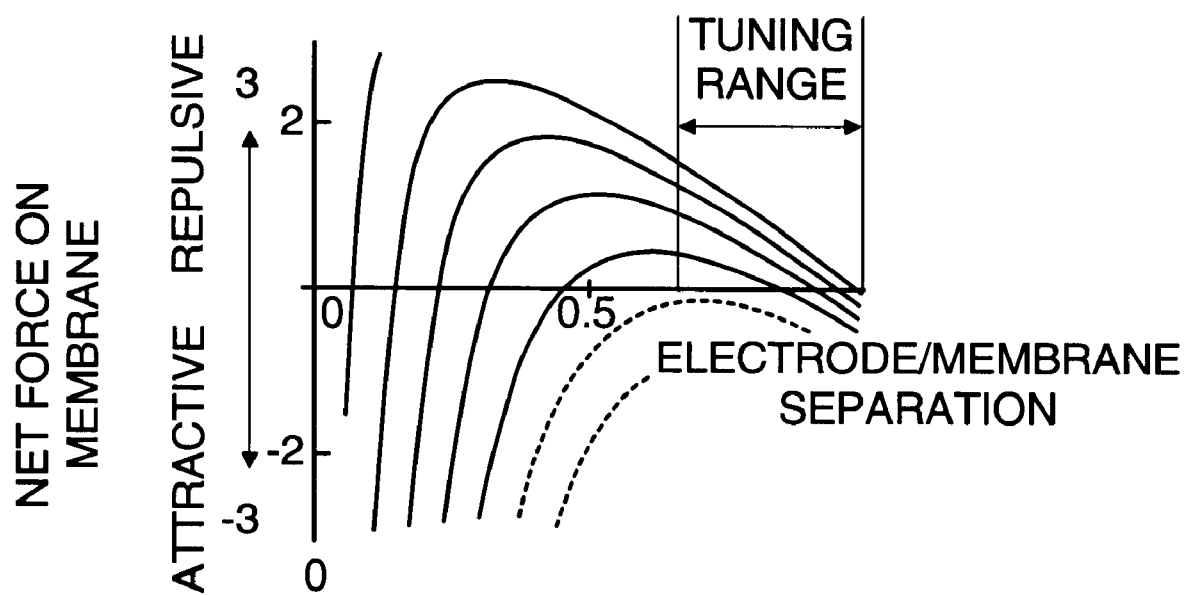
FIG. 2 is a schematic plot illustrating an exemplary relationship of the separation distance between an electrode and a movable membrane versus the net attractive/repulsive electrostatic force on the membrane, for several applied voltages, in accordance with the invention.

The reflectors 16 and 14 define the optical cavity 18 of the device 10, which in this case has a concave shape due to the concave shape of the reflecting surface of the reflector 16. The curved reflector can be formed in accordance with the approach described in U.S. Pat. No. 5,618,474, incorporated herein by reference above. The length of the cavity 18 is changed to tune the filter 10 by applying a voltage across the moving membrane reflector electrode 14 and the tuning drive electrode 12 using the adjustable voltage source 22. Upon application of the tuning voltage, an electric field is generated in the electrostatic drive spacing or cavity 20. The electrostatic forces cause the membrane to deflect, thus altering the length of the optical cavity 18 as desired. FIG. 2 is a schematic plot illustrating an exemplary relationship of the separation distance between the electrode 12 and membrane 14 versus the net attractive/repulsive electrostatic force on the membrane 14, for several applied voltages. A tuning range is illustrated in which electrode/membrane contact is avoided.

Figure 3F:
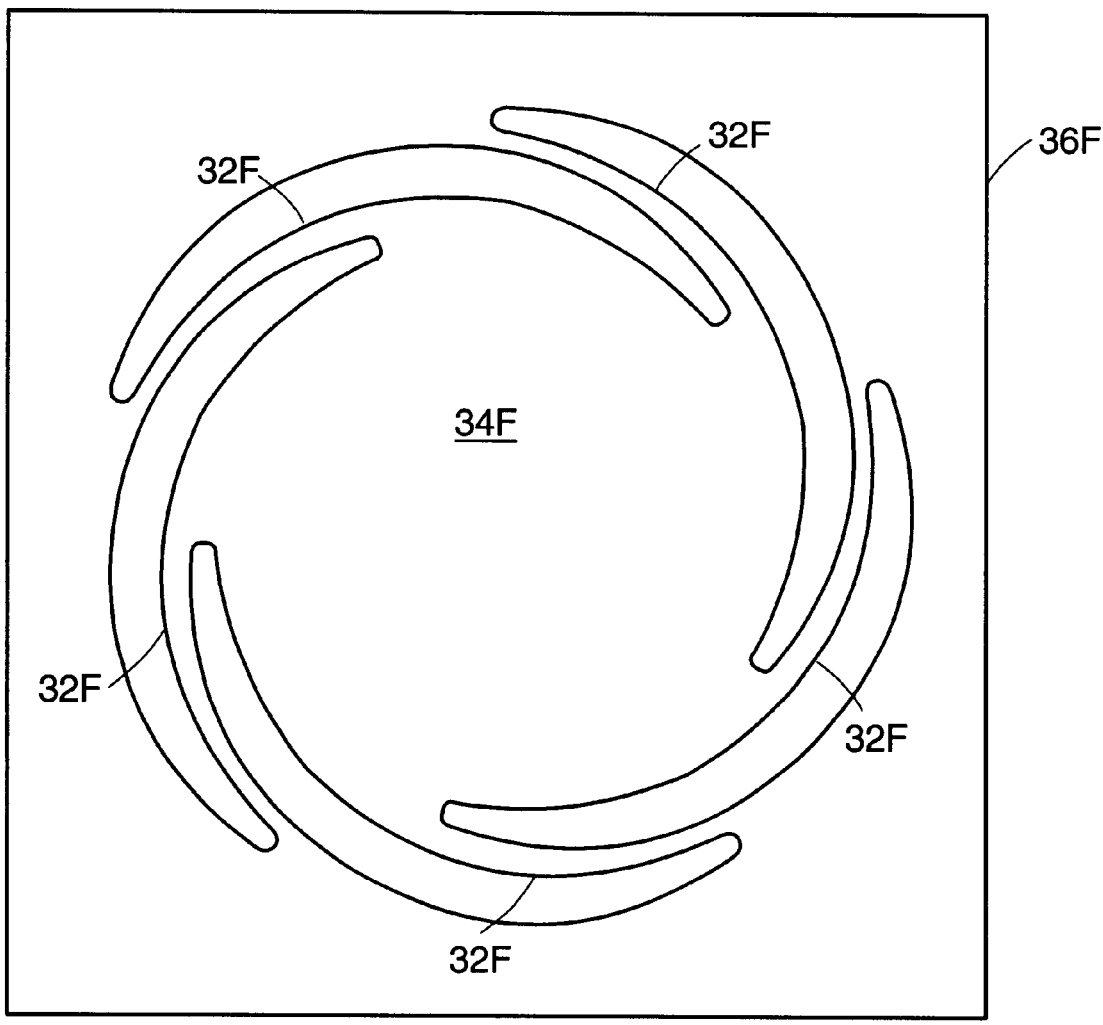
Figure 3G:
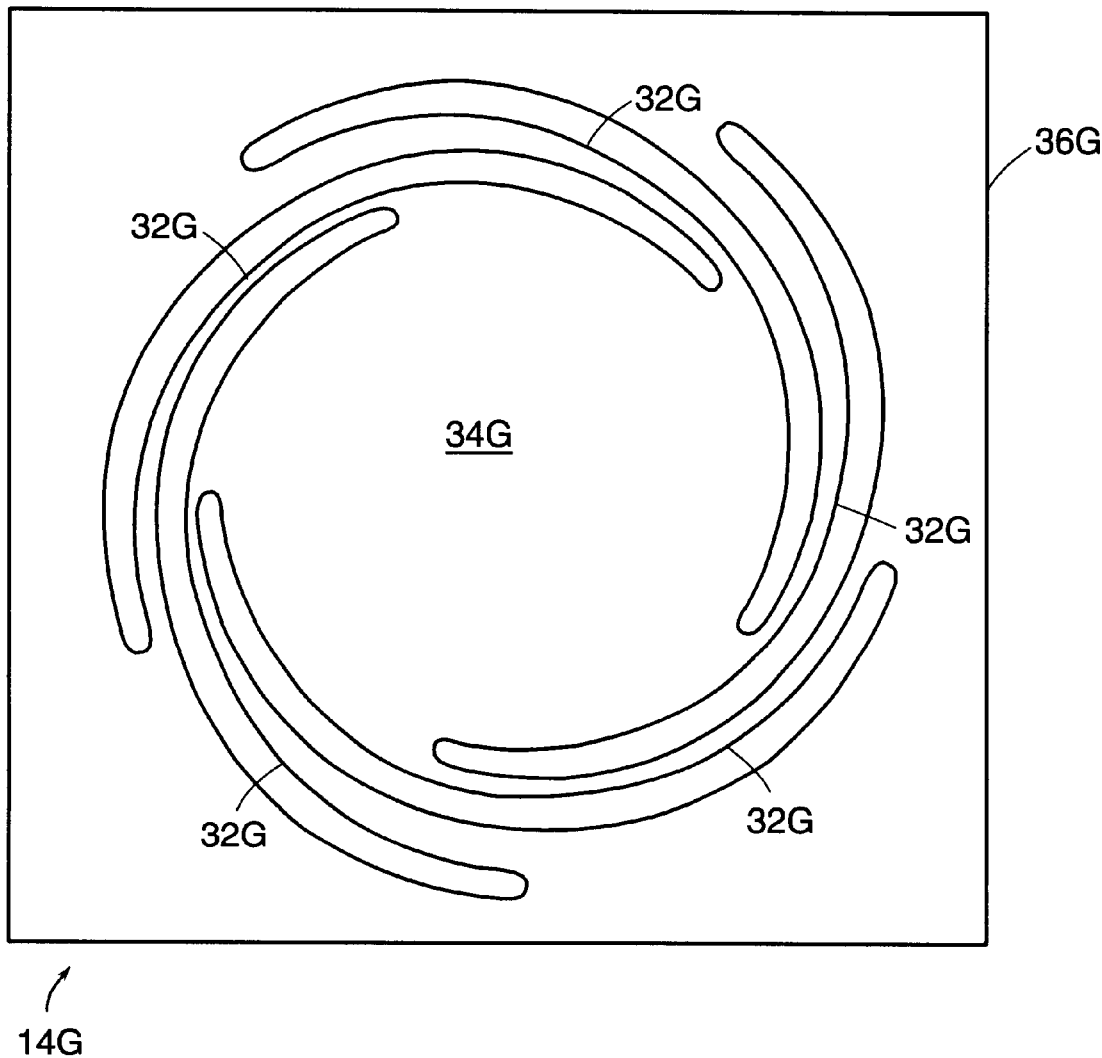

In accordance with the invention, the reflective membrane layer 14 is made to deflect under the applied voltage to change the cavity length and thereby tune the filter 10. FIGS. 3A through 3G are schematic plan views of various configurations of the movable membrane layer 14 in accordance with the invention. As shown in FIGS. 3A through 3G, each membrane layer 14 includes an outer body portion 36 and an inner membrane portion 34. The membrane portion 34 is supported in the outer body portion 36 by a pattern of tethers or flexures 32. In FIGS. 3A though 3G, the layers 14 can be primarily distinguished by their tether patterns. FIG. 3A illustrates a straight or radial tether pattern with six radial tethers 32A. FIG. 3B illustrates a straight or radial tether pattern with five tethers 32B. FIG. 3C illustrates a "loop" tether configuration in which tethers feed or loop back on themselves in the area between the outer body 36C and the movable membrane 34C. FIG. 3D illustrates a dogleg spiral tether pattern, referred to as a "thin" spiral because the tethers 32D are relatively thin. FIG. 3E illustrates a "thick" dogleg spiral pattern with relatively thick tethers 32E. FIG. 3F illustrates a nested spiral pattern in which the tethers 32F can be extended to overlap each other. FIG. 3G illustrates a nested swept tether design in which the tethers 32G are extended to overlap each other. That is, the length of the tethers is such that a radial line extending from the center of the membrane portion 34G could intersect multiple, e.g., two, tethers 32G.

It is noted that in the loop and spiral tether patterns of FIGS. 3C through 3G, longer tethers 32 are realized in the same overall device size. This can help provide desired membrane deflection performance without having to increase the size of the device. For micro-electromechanical system (MEMS) -based devices, such as the filter of the present invention, using a deflectable membrane structure, it is desirable to optimize the stiffness of the supporting tethers to meet a given set of performance requirements. By using a spiral tether design, the diameter of the inner membrane portion 34 can be made larger for an equivalent length radial tether (holding the outside diameter fixed). This provides a proportionally larger area over which the electrostatic forces can act, thereby reducing the voltage requirement of the device.

The effective area of the radial tether designs can be increased by adding "paddles" to the central membrane. These are appendages that extend outward from the inner membrane in regions between the tethers. The paddles extending from the central membrane can introduce undesirable vibrational modes to the structure, however. Additional constraints are imposed on the design process by the limitations of available fabrication methods. For example, if a designer is required to decrease the stiffness of the structure while maintaining a constant membrane and tether thickness, there are two options: 1) increase the tether length; or 2) decrease the tether width. It is usually more desirable to increase the tether length since the stiffness of a beam is more sensitive to changes in length. However, for a straight tether geometry, this results in an overall increase in device size, which may violate a performance requirement. While decreasing the width of a tether will reduce its stiffness, the lower limit that can be achieved will be imposed by limitations in the fabrication process. For microfabricated devices, the minimum tether width is determined by minimum resolvable feature size that can be produced using the available photolithography and/or etching processes. As the tether width approaches this minimum, the structural response of the system will become more sensitive to process variations, making it difficult to achieve high yield in manufacturing.

A spiral tether geometry is one in which the tether originates from the central membrane at an angle oblique to the local normal. The tether continues along a trajectory such that it intersects the outer circumference of the device at a similar angle, although the originating and terminating angles need not be equal. This is distinct from a straight tether design in which the tethers originate from the central membrane in a purely radial direction and likewise intersect the outer circumference. In the case of spiral geometries, such as those shown in FIGS. 3D through 3G, by orienting the tethers at an oblique angle, longer tethers are possible for a given overall device size. Thus, a membrane structure with a given spring constant, i.e., stiffness, can be achieved within a smaller overall diameter. Furthermore, with a spiral geometry, the tethers can be nested together, as shown in FIGS. 3F and 3G. That is, the originating point of one tether can occur at an azimuthal angle less than that of the point of termination of the neighboring tether. This can be seen in FIG. 3G proceeding counter-clockwise around the pattern and assuming that tethers 32G originate on the inner membrane portion 34G and terminate on the outer body portion 36G. This feature allows the tether length to be varied over a wider range of values, thus providing greater freedom of design. Since the length can be increased to a larger value, the width of the tether can be maintained at a value well above the resolution of the fabrication process, thus improving the manufacturability of the device.

An additional performance advantage of the spiral tether geometry is that it has reduced response to stresses transferred from the central membrane area, compared to straight tether designs. For the tunable filter of the invention, a (HR) coating is applied to the central membrane to form a moving mirror. Residual stress in this coating induces curvature in the central membrane. Experimental measurements and finite element analyses have shown that the resulting deflection of spiral tethers is less than that of straight tethers. This improved immunity to residual stress in the high reflectivity coating improves the manufacturing yield of the devices. In accordance with the invention, spiral tether geometries are developed to minimize the induced deflection.

Various processes for fabricating the filter of the invention will now be described in detail. FIGS. 4A through 4I contain schematic cross-sectional views illustrating fabrication of one embodiment of the filter of the invention. In this embodiment, referred to as "Oxide Defined Electrostatic Drive," the assembly starts with a base wafer, Wafer A, which in one embodiment is produced from a standard n-type doped silicon wafer and which serves as the supporting substrate for the entire device. Wafer A is typically 75 mm to 150 mm in diameter and is 400 to 500 microns thick. The wafer A is oxidized to a depth $x_1$, typically 2 to 4 microns and which is specified to achieve the design parameters for the electrostatic tuning drive. The maximum tuning range is approximately 33% of this oxide thickness (see FIG. 2), and the required maximum tuning voltage is inversely proportional to the square of the thickness, as is typical for electrostatic drives.

Figure 4A:
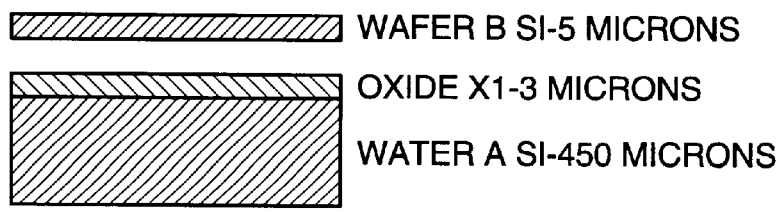
FIGS. 4A through 4I contain schematic cross-sectional views illustrating fabrication of one embodiment of the filter of the invention.
Figure 4B:
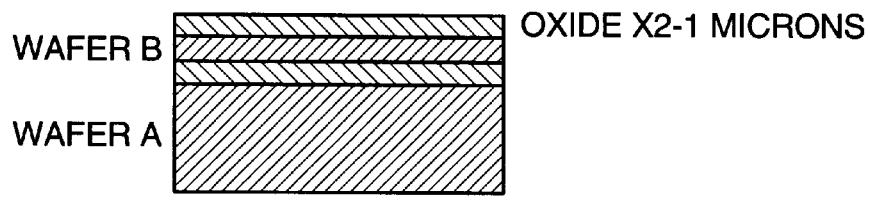
Figure 4C:
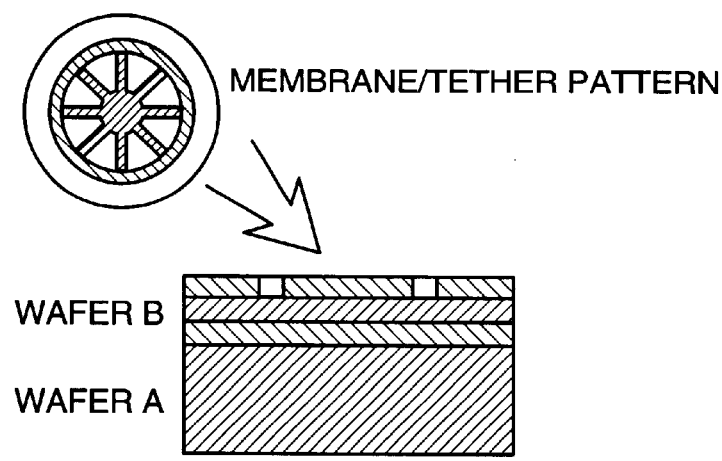

As shown in FIG. 4B, a second n-type doped silicon wafer, Wafer B, is bonded to Wafer A using elevated temperature and mechanical pressure. Wafer B, which will become the electrostatically deflectable silicon membrane, is ground to a thickness $t_1$, typically 6 to 10 microns. After grinding, the surface of Wafer B is oxidized to a thickness $x_2$, typically 0.5 to 1.0 micron. As shown in FIG. 4C, a membrane and tether pattern, such as those shown in FIGS. 3A through 3G, is etched into the oxide grown on Wafer B.

Figure 4D:
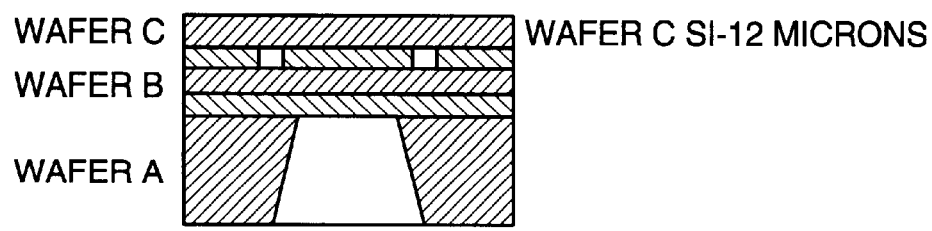

Next, as shown in FIG. 4D, a third n-type doped silicon wafer, Wafer C, is bonded to the oxide on Wafer B, again using elevated temperature and mechanical pressure. This wafer, Wafer C, will become the cavity spacer that defines the optical properties of the FPF. Wafer C buries the membrane-patterned oxide on Wafer B and is subsequently ground to a thickness $t_2$, typically 15 to 25 microns, that is appropriate to the mirror-to-mirror spacing of the curved mirror-flat mirror Fabry-Perot optical cavity. This translates to a free spectral range of 45 to 80 nm.

Figure 4E:
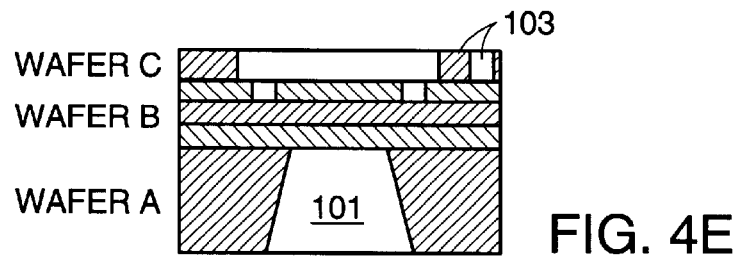
Figure 4F:
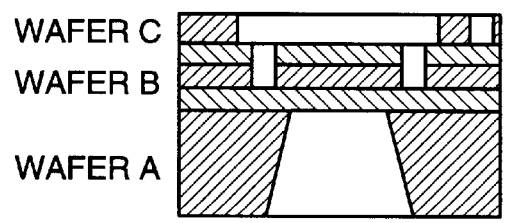

As shown in FIG. 4E, an optical port 101 is patterned and etched into Wafer A using a combination of isotropic and anisotropic etching. The oxide layer $x_1$ is used as an etch stop. Alternatively, the optical port etch step can be omitted, as silicon is partially transparent at infrared wavelengths, in which case an anti-reflective (AR) coating is applied to the outer surface of Wafer A to minimize reflection from the air-silicon interface. With the process described, the underside of the membrane and opposing side of the handle wafer will not have AR. Thus, the optical performance of the device could be compromised. A spacer and electrical contact pattern 103 is etched into Wafer C using the oxide of thickness $x_2$ as an etch-stop layer. As shown in FIG. 4F, a silicon etch is performed anisotropically to transfer the diaphragm and tether pattern into the underlying silicon (Wafer B), using the oxide of thickness $x_1$ as an etch stop layer. One approach would be to use directional reactive ion etching for this step.

Figure 4G:
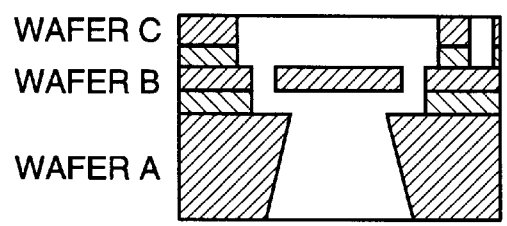

As shown in FIG. 4G, the resulting structure is subjected to an isotropic oxide etchant to "release" the membrane and tether structure from the oxide layer $x_1$, and the etch-stop oxide is removed from the openings forming the spacer and contact. In one embodiment, this would call for the use of concentrated HF followed by methanol, followed by a drying step using supercritical carbon dioxide.

Figure 4H:
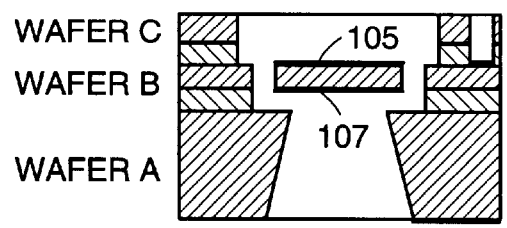

As shown in FIG. 4H, a high reflectivity (HR) multi-layer dielectric mirror 105 is deposited through the spacer opening onto the membrane interior surface using an appropriate shadow mask. An anti-reflection (AR) coating 107 is similarly deposited through the optical port onto the exterior surface of the membrane. Both of these coatings are designed for the wavelength bands of interest.

Figure 4I:
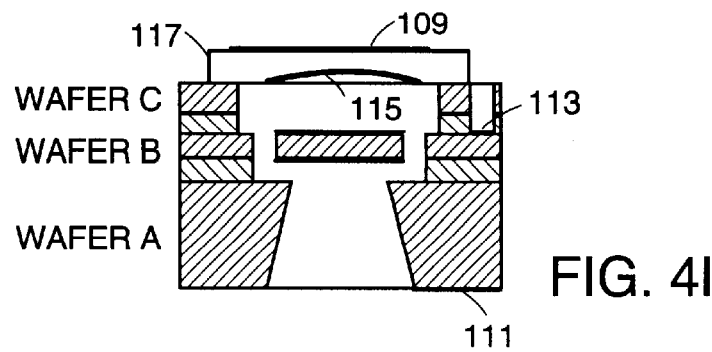

Next, as shown in FIG. 4I, electrical contacts 111 and 113 are deposited on the back side of Wafer A and in the contact opening of Wafer B, respectively, in one embodiment using aluminum or a refractory metal. Next, as shown in FIG. 4I, a concave, highly polished micro-mirror 117 is installed on top of the spacer layer. In one embodiment, the mirror 117 is made in accordance with U.S. Pat. 5,618,474, incorporated herein by reference. The mirror 117 has an appropriate HR coating 115 on its interior surface and an appropriate AR coating 109 on its exterior surface, so that it forms a precision, high-finesse optical cavity in conjunction with the diaphragm or membrane. High parallelism and accurate spacing is maintained because of the uniformity of the spacer grinding thickness. The mirror attachment can be performed using gold-tin attachment layers (or Au/AuSn spacers in the alternate implementation without the spacer wafer attached) formed by deposition of plating. If a deposited or plated spacer is used, the metal composition may be graded so that eutectic melting occurs only near the attachment interface to the mirror.

Figure 5A:
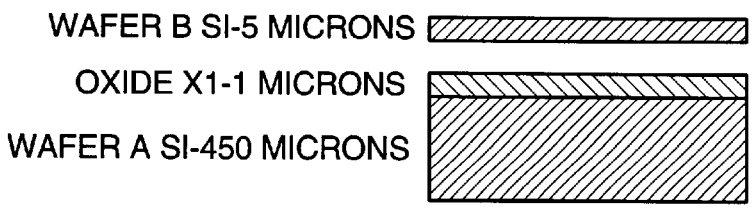
FIGS. 5A through 5G contain schematic cross-sectional views illustrating fabrication of another embodiment of the filter of the invention.
Figure 5B:
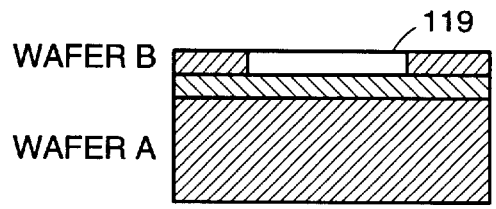

FIGS. 5A through 5G contain schematic cross-sectional views illustrating fabrication of another embodiment of the filter of the invention. In this embodiment, referred to as "Silicon Defined Electrostatic Drive," the wafer assembly again starts with the base wafer, Wafer A, which will become the supporting substrate for the entire device, as shown in FIG. 5A. In one embodiment, Wafer A is 75 mm to 150 mm in diameter and 400 to 500 microns thick. The wafer is oxidized, or receives deposited oxide which is subsequently densified, to a thickness $x_1$, typically 0.5 to 1.0 micron. A second n-type doped silicon wafer, Wafer B, is bonded to Wafer A using elevated temperature and mechanical pressure. Wafer B, which in this embodiment will become the spacer between the membrane and the drive electrode, is ground to a thickness $t_1$, which can be 1 to 3.5 microns. As shown in FIG. 5B, after grinding, Wafer B is patterned and etched to form part of the cavity 119 between the mirror membrane and electrode. During this etch, the oxide layer of thickness $x_1$ is used as an etch stop. Alternatively, the cavity etch can be omitted and performed at a later step.

Figure 5C:
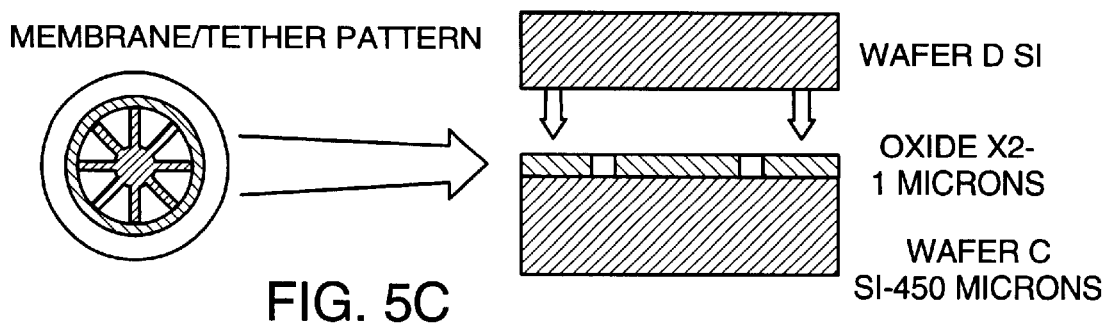
Figure 5D:
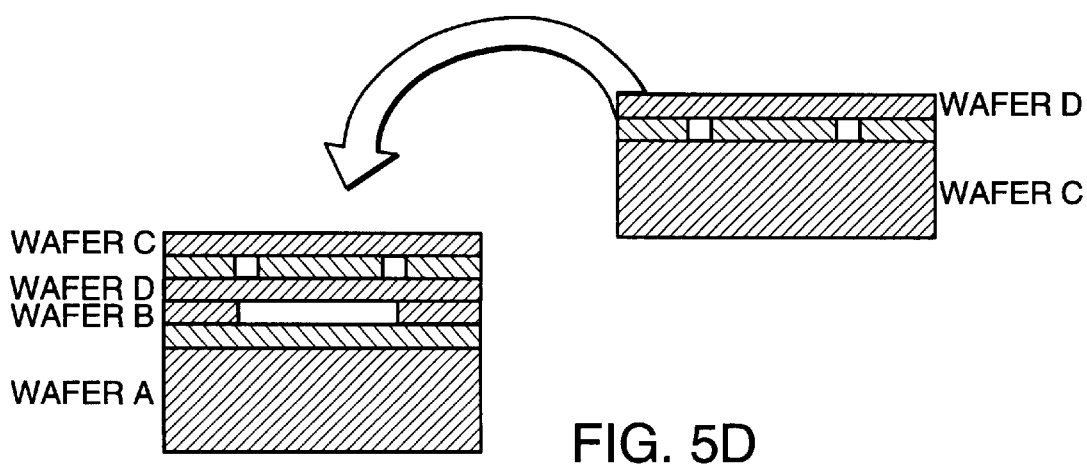

Referring to FIG. 5C, setting aside the A–B structure, a separate, 400–500 microns thick, n-type doped silicon wafer, Wafer C, of the same size as Wafers A and B, is oxidized, or receives deposited oxide which is subsequently densified, to a thickness $x_2$, which can be 0.5 to 1.0 micron. Wafer C is patterned and the oxide thickness $x_2$ is etched to form a deflectable mirror membrane and tether pattern. Another n-type doped silicon wafer, Wafer D, is bonded to Wafer C. Wafer D is ground to a thickness $t_1$ suitable for an electrostatically deflectable silicon membrane thickness, which can be 6 to 10 microns. As shown in FIG. 5D, Wafer C/D assembly is flipped over, and the ground surface of Wafer D is bonded to the oxidized surface of Wafer B using elevated temperature and mechanical pressure. Wafer C is subsequently ground to a thickness $t_2$, which can be 15 to 25 microns, appropriate to the mirror-to-mirror spacing of the curved mirror-flat mirror Fabry-Perot optical cavity.

Figure 5E:
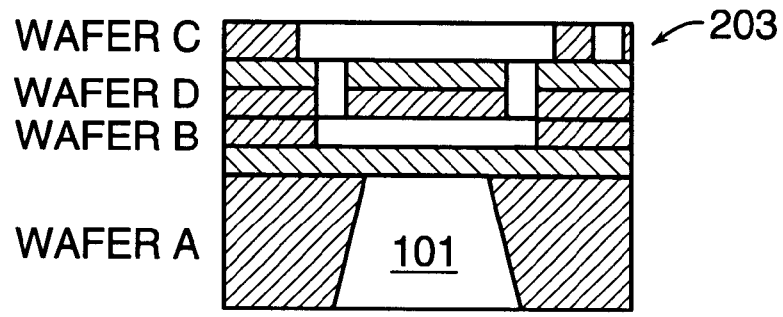

Referring to FIG. 5E, an optical port 101 is patterned and etched into Wafer A, using a combination of isotropic and anisotropic etching. The oxide of thickness $x_1$, is used as an etch stop. If the cavity etch was not performed in an earlier step, the oxide of thickness $x_1$ is removed, and the cavity is formed by isotropic etching. As in the embodiment described above in connection with FIGS. 4A through 4I, the optical port etch step can be omitted. If the optical port is omitted, an anti-reflective (AR) coating is applied to the outer surface of Wafer A to minimize reflection from the air-silicon interface.

Figure 5F:
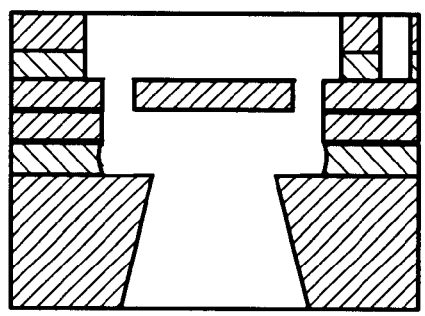

As shown in FIG. 5E, a spacer and electrical contact pattern is etched into Wafer C, using the oxide $x_2$ as an etch stop layer. This is followed by an anisotropic silicon etch to transfer the diaphragm or membrane and tether pattern from the oxide $x_2$ into the underlying silicon (oxide $x_1$ is the etch stop layer). In one implementation, directional reactive ion etching is used for this step. Next, as shown in FIG. 5F, the etch stop oxides are removed from the openings, releasing the diaphragm and tethers without wet etchant, thus avoiding the static friction ("stiction") caused by liquid surface tension.

The remaining steps are similar to those of the embodiment described above in connection with FIGS. 4A though 4I. A HR mirror layer 105 is deposited through an appropriate shadow mask and the spacer opening onto the membrane surface, and an AR coating 107 is deposited on the optical port side of the membrane. Electrical contacts 111 and 113 are deposited on the surfaces of Wafer A and Wafer D. The contacts 111 and 113 can be made of aluminum or a refractory metal.

Figure 5G:
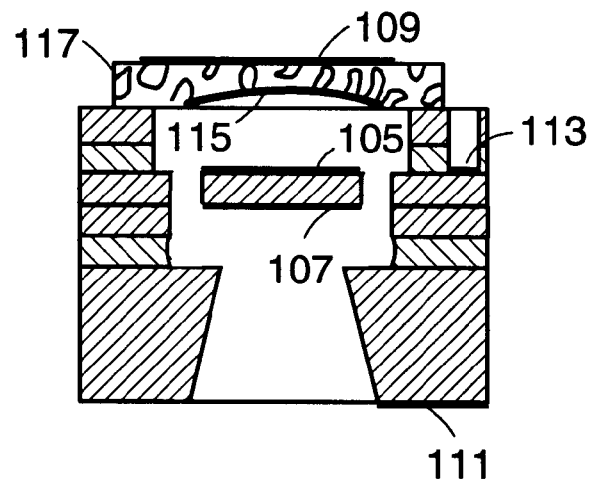

Referring to FIG. 5G, a curved mirror 117 with an HR coating 115 and patterned metallization, e.g., Ti—Au, 0.5 micron thickness, is attached to the spacer layer, establishing a precision gap between the curved mirror surface and the HR coating 105 on the membrane. High parallelism is maintained because of the uniformity of the spacer grinding thickness. The mirror attachment can be performed using AuSn attachment layers (or Au/AuSn) formed by deposition of plating. If a deposited or plated spacer is used, the metal composition may be graded so that eutectic melting occurs only near the attachment interface to the mirror.

FIGS. 6A through 6G contain schematic cross-sectional views illustrating fabrication of another embodiment of the filter of the invention. In this embodiment, referred to as "Plated Airbridge," the assembly starts with a standard n-type doped silicon wafer, Wafer A, which in one embodiment is 75 mm to 150 mm in diameter and 400 to 500 microns thick. In this embodiment, Wafer A is used as the cavity spacer for the Fabry-Perot cavity, a dielectric membrane is the moving mirror, and a plated electrode formed by an "airbridge" technique is the fixed drive electrode.

Figure 6A:
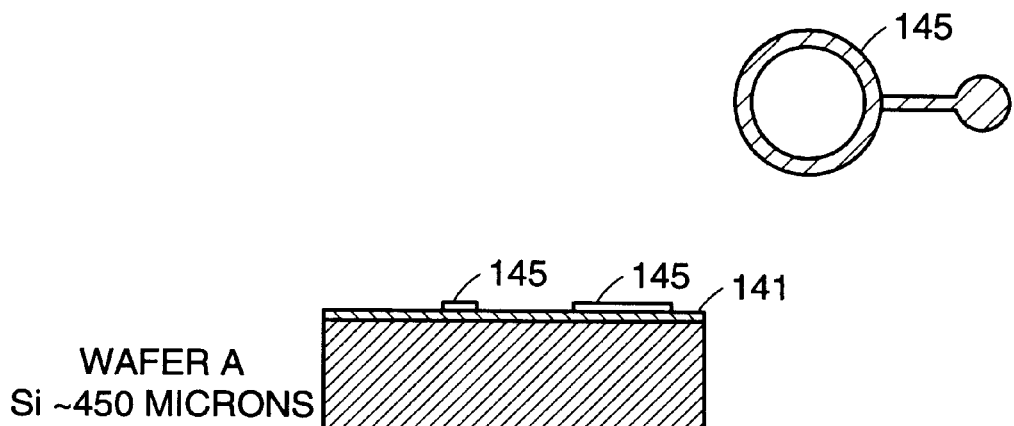
FIGS. 6A through 6F contain schematic cross-sectional views illustrating fabrication of another embodiment of the filter of the invention.

Referring to FIG. 6A, the process starts with application of a HR coating on the top surface of Wafer A, followed by an AR coating, at a thickness of 3 to 9 microns, on the HR coating. This resulting dielectric membrane 141 will become the moving membrane of the filter as described below. In one embodiment, the HR/AR coating 141 includes alternating layers of dielectric material such as $SiO_x$ or $TiO_x$ with the thicknesses and deposition conditions adjusted to leave a net tensile stress in the dielectric film.

The membrane electrode pattern 145 is created next. A resist layer is applied, exposed and patterned using, for example, an image reversal technique, to achieve resist undercut. Next, electrode metal, such as Ti—Pt—Au or Ti—Ni—Au, of total thickness of 0.5 micron is deposited.

The metal is then lifted off to leave patterned membrane electrode metal, metal traces and bonding pads. Alternatively, the electrode metal is deposited first, patterned with resist, then etched to form the membrane electrode metal.

Figure 6B:
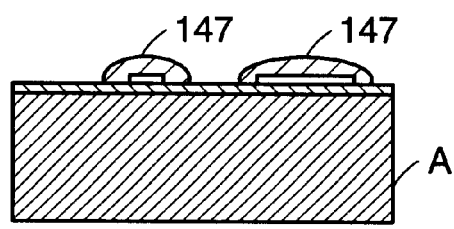

Referring now to FIG. 6B, next, another layer of resist 147, the "airbridge" resist, is applied, exposed and patterned on the surface of the HR/AR coating layer 141 and electrode pattern 145. This resist 147 is used to protect the membrane electrodes and define the gap between the membrane electrodes and the fixed electrodes, which are deposited next. In order to protect the existing membrane electrodes and properly form the fixed electrodes, the patterned resist 147 is reflowed.

Figure 6C:
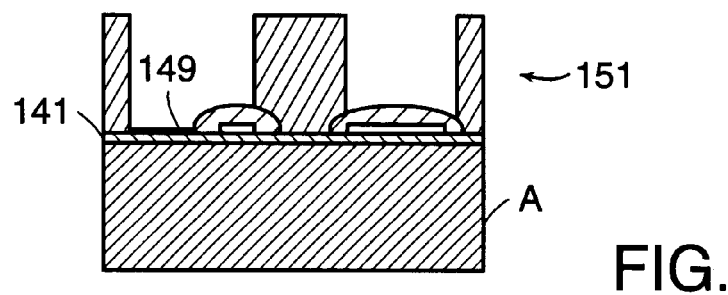
Figure 6D:
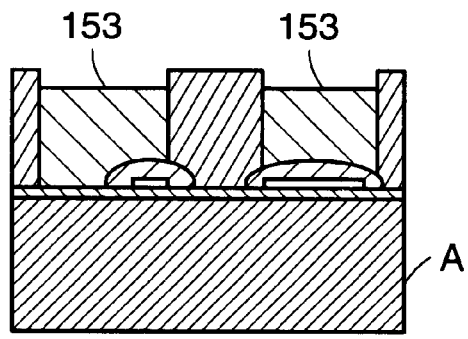

Referring to FIG. 6C, a plating base layer 149, which can be a 0.5 micron thick sputtered Ti—Au layer, is deposited over the patterned resist and in the resist openings. Next, a thick layer of resist or PMMA 151 is deposited on or mechanically attached to the plating base layer 149. In one embodiment, the thickness of this resist or PMMA 151 is 20 to 600 microns. The thick resist or PMMA 151 is exposed with UV, DUV or soft X-rays (for example, synchrotron-generated X-rays, as in the LIGA technique) then developed to form the plating pattern. Next, referring to FIG. 6D, attaching one electrode to the plating base layer, the wafer is electroplated with Au, Ni, NiFe or other suitable plating metal 153. Plating thickness can be as much as the plating resist or PMMA thickness. In one embodiment, the plating thickness is 20 to 600 microns. This plated layer 153 forms airbridge electrodes facing the membrane electrodes, an optical port and an integral mounting structure.

Figure 6E:
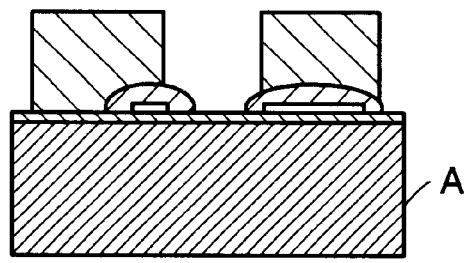

Referring to FIG. 6E, next, the thick resist or PMMA is removed, followed by removal of the unplated, sputtered plating base layer 149, using ion milling or Au etchant. The exposed airbridge resist is removed using isotropic dry etching with heating in a fluorinated oxygen plasma.

In one implementation, the plated integral mounting structure is designed to attach to a surface perpendicular to the optical cavity axis using AuSn solder.

Figure 6F:
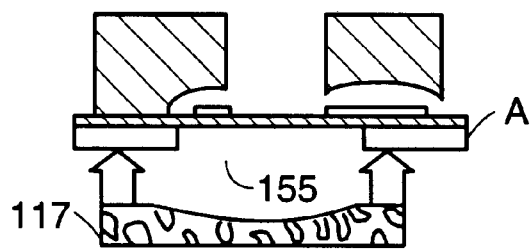

Referring to FIG. 6F, using the plated structure for support, Wafer A is ground to a thickness $t_2$, which in one embodiment is 15 to 25 microns, appropriate to the mirror-to-mirror spacing of the curved mirror-flat mirror Fabry-Perot cavity. A spacer opening 155 is patterned and etched into Wafer A, using a combination of isotropic and anisotropic etching. The HR/AR layer 141 is used as an etch stop. The HR/AR layer 141 is released at this point, such that it now simultaneously mechanical an optical functions. The mechanical function is the support of the deflectable membrane over the spacer opening, and the optical function is the HR/AR capabilities.

Referring to FIG. 6F, the curved mirror 117 is then attached as in the previous embodiments.

In the embodiments of the invention described thus far, the length of the optical cavity, i.e., the spacing between the curved reflector and the membrane, is controlled by the thickness of a silicon and/or an oxide layer. FIGS. 7A through 7G contain schematic cross-sectional views illustrating fabrication of another embodiment of the filter of the invention, in which the spacing and, therefore, the length of the optical cavity can be more precisely controlled by the thickness of one or more metal layers which are plated or bonded to either the surface of the layer in which the membrane is formed or the surface of the curved mirror structure.

Figure 7A:
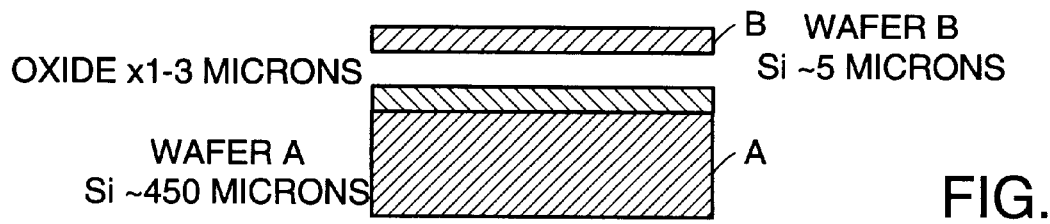
FIGS. 7A through 7G contain schematic cross-sectional views illustrating fabrication of another embodiment of the filter of the invention.
Figure 7B:
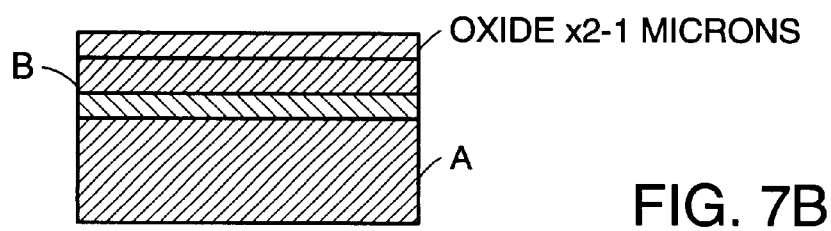
Figure 7C:
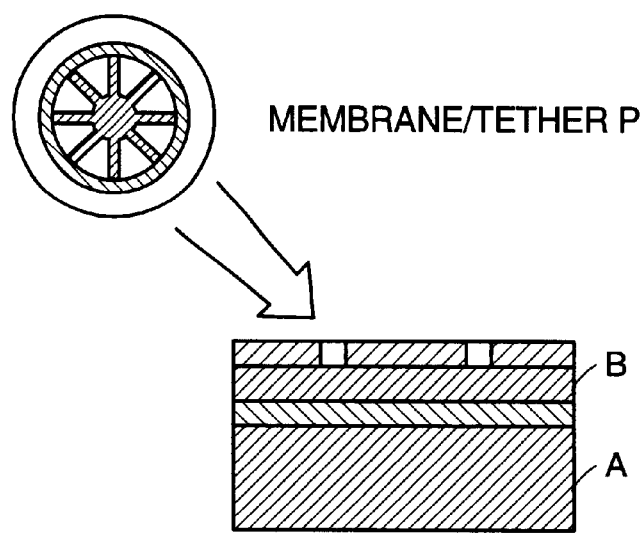
Figure 7D:
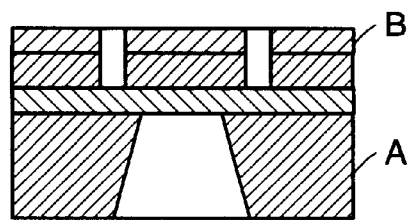
Figure 7E:
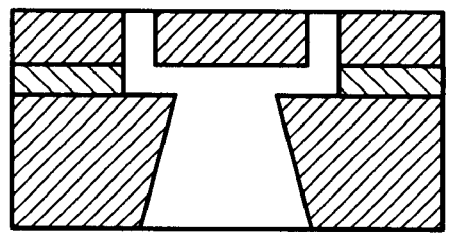
Figure 7F:
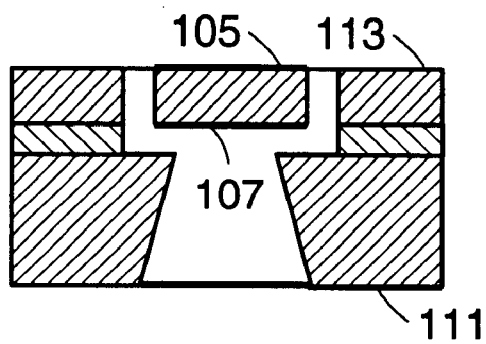
Figure 7G:
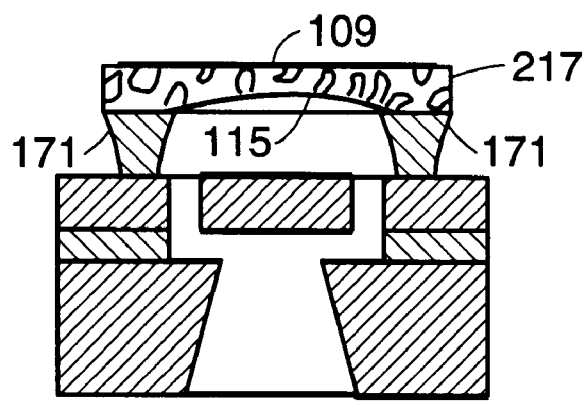

Referring to FIGS. 7A through 7G, it is noted that the steps illustrated in FIGS. 7A through 7C are the same as those illustrated and described above in connection with FIGS. 4A through 4C. Therefore, description of them will be omitted. In FIG. 7D, Wafer B is etched to form the membrane and tether pattern in the wafer. In FIG. 7E, the remaining oxides on top of Wafer B are etched away isotropically. In FIG. 7F, the HR coating 105 and AR coating 107 are applied to the membrane and the electrodes 111 and 113 are applied to Wafer A and Wafer B, respectively, as in the previous embodiments. In FIG. 7G, the mirror assembly 217 is mounted on the top of Wafer B. Spacing posts 171 are interposed between the top of Wafer B and the mirror assembly 217 to control the cavity length between the mirrors.

Figure 8A:
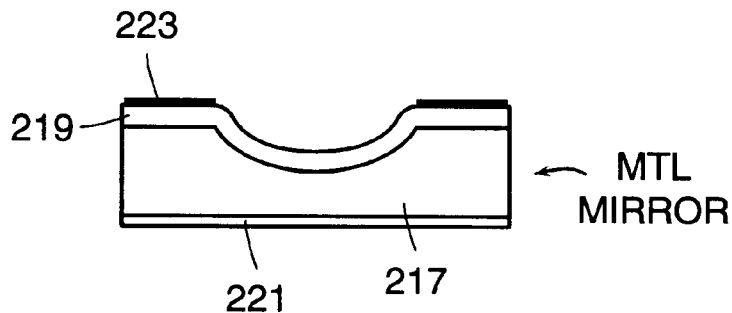
FIGS. 8A through 8C contain schematic cross-sectional views illustrating an approach to forming spacing posts for defining the length of the optical cavity in the filter according to the present invention.
Figure 8B:
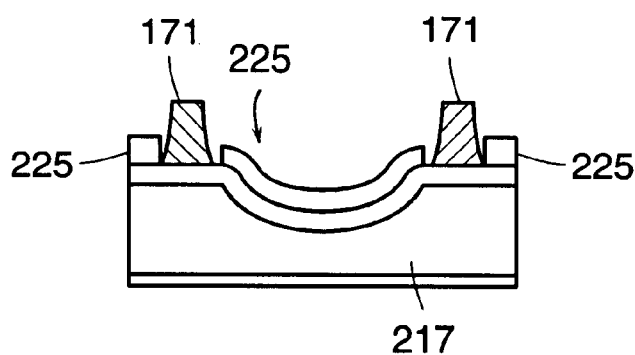
Figure 8C:
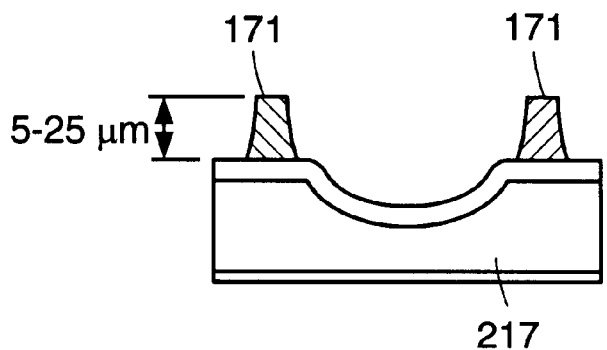

FIGS. 8A through 8C contain schematic cross-sectional views illustrating an approach to forming the spacing posts 171 illustrated in FIG. 7G. In FIG. 8A, the mirror assembly 217 includes an AR coating 221 on its bottom and sides and a HR coating 219 on its top surfaces as shown. A metal seed layer 223 is sputtered onto the edges of the curved portion of the mirror surface as shown.

Next, in FIG. 8B, a layer of photoresist 225 is applied and patterned to define the location and size of the spacing posts 171. The metal spacers 171 are then formed by plating the exposed seed layer with a metal such as gold. The metal is plated to a thickness suitable for the cavity length of the device. In one embodiment, the thickness is 5 to 25 microns. Referring to FIG. 8C, the photoresist is removed, leaving the mirror assembly 217 with the spacing posts 171.

Figure 9A:
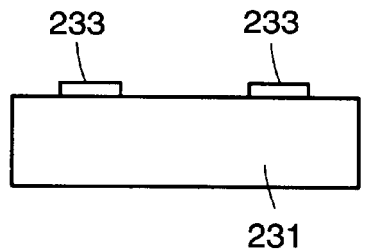
FIGS. 9A through 9D contain schematic cross-sectional views illustrating another approach to forming spacing posts for defining the length of the optical cavity in the filter according to the present invention.

FIGS. 9A through 9D contain schematic cross-sectional views illustrating another approach to forming the spacing posts 171 illustrated in FIG. 7G. As shown in FIG. 9A, a sacrificial bonding layer made of, for example, titanium, copper and/or tungsten, is formed on a surrogate substrate 231 and patterned, leaving pads 233 on which the spacing posts 171 will be formed.

Figure 9B:
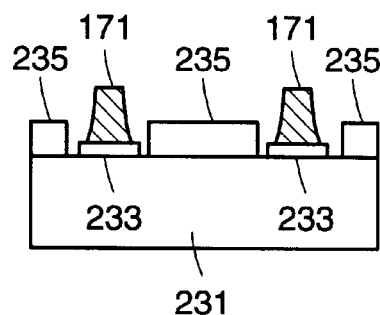
Figure 9C:
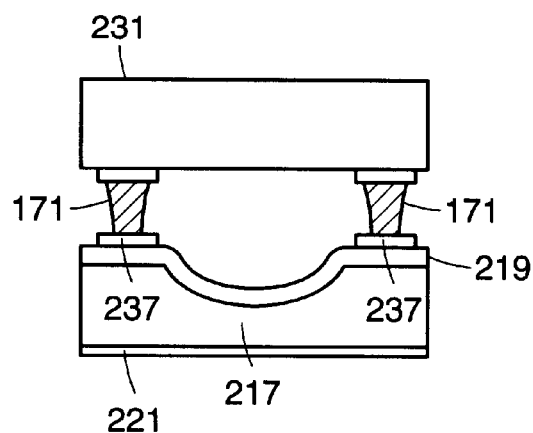
Figure 9D:
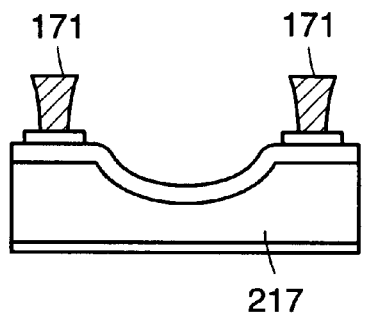

Next, as shown in FIG. 9B, a photoresist pattern 235 is deposited and patterned as shown to define the location and size of the spacing posts. The posts are then formed by plating metal such as gold onto the pads 233 to a thickness appropriate for the desired cavity length. In one embodiment, the posts 171 are plated to a height of 15 to 25 microns. Next, as shown in FIG. 9C, the substrate 231 with the posts 171 is flipped, and the posts 171 are bonded to bonding metal pads 237 made of, for example, gold, formed on the mirror assembly 217. Next, as shown in FIG. 9D, the surrogate substrate 231 and plating seed pads 233 are removed, leaving the tops of the spacing posts 171 ready for bonding to the remainder of the device, as described above.

It should be noted that any of the bonding steps described herein can be performed by a thermo-compression bonding process. Under that process, the surfaces being bonded together are formed with a multiple conductor structure which includes a titanium adhesion layer formed on the surface of the device to be bonded. A platinum diffusion barrier layer is formed over the adhesion layer, and the gold bonding layer is formed over the barrier layer. The two structures are then attached at their bonding layers, and the composite device is subjected to elevated temperature, e.g., 320 degrees C., and pressure, e.g., 200 psi, for a predetermined period of time, which in one embodiment is approximately three minutes. The high pressure and heat cause the structures to bond together.

It is also noted that when the tuning voltage is applied to the electrodes of the invention, it is possible that the membrane may deflect sufficiently to make contact with other device surfaces. For example, referring to FIG. 4I, it is possible for the bottom side of the membrane formed in Wafer B to make contact with the top surface of Wafer A across the electrostatic cavity. After the surfaces touch, it can be difficult to separate them, even after the voltage is removed, due to static friction or stiction between the two surfaces. To solve this problem, in one embodiment of the invention, one or both of the surfaces can be roughened to reduce the amount of surface area in contact. In one embodiment, the roughening is performed by an etching and/or polishing process to the original wafer or wafers before assembly. For example, the top surface of Wafer A can be subjected to the roughening process, such as by plasma etching or buffered HF. In one embodiment, roughening to 5 to 20 nm is used. Alternatively, fluorocarbon films are applied to one or both surfaces.

Figure 10:
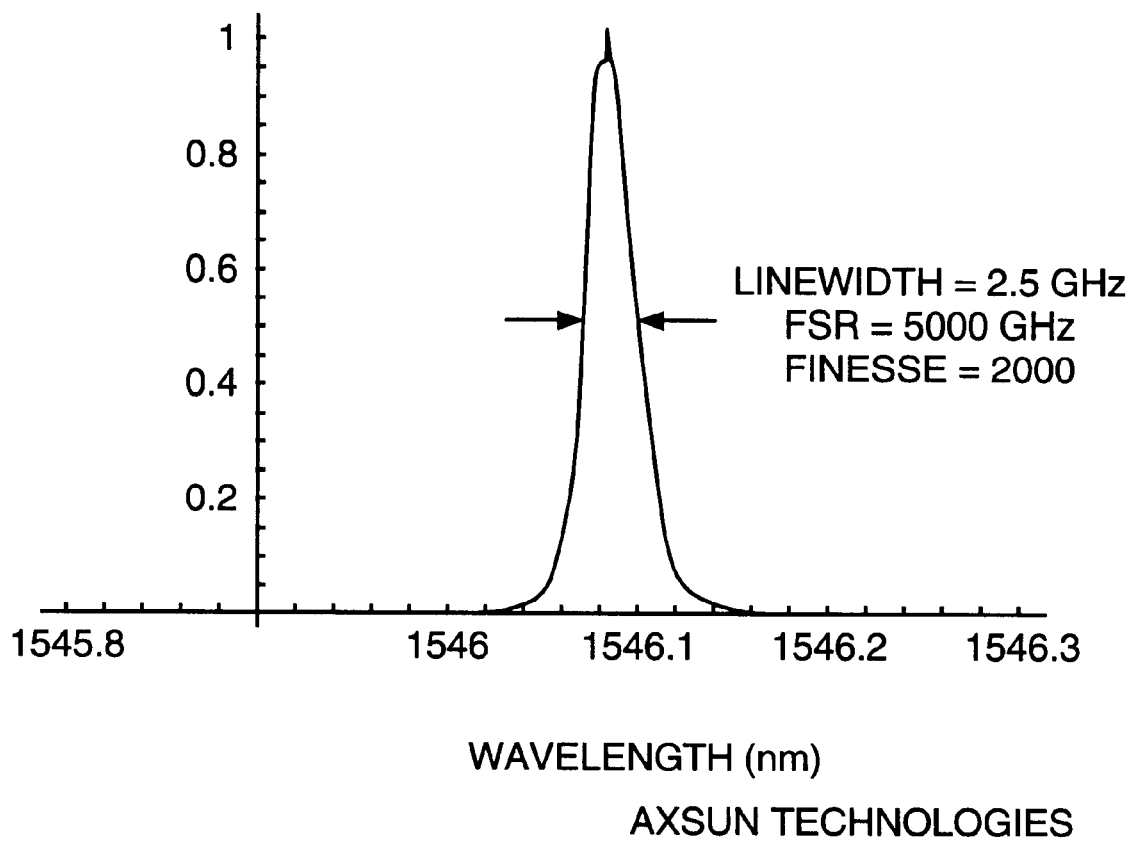
FIG. 10 contains a schematic plot of wavelength versus gain illustrating the performance of one embodiment of the improved tunable FPF of the invention.

FIG. 10 contains a schematic plot of wavelength versus gain illustrating the performance of one embodiment of the improved tunable FPF of the invention. The plot illustrates the peak wavelength in the passband of the filter. The peak is relatively narrow in wavelength compared to the peaks obtained by FPFs tunable in accordance with conventional methods.

Figure 11A:
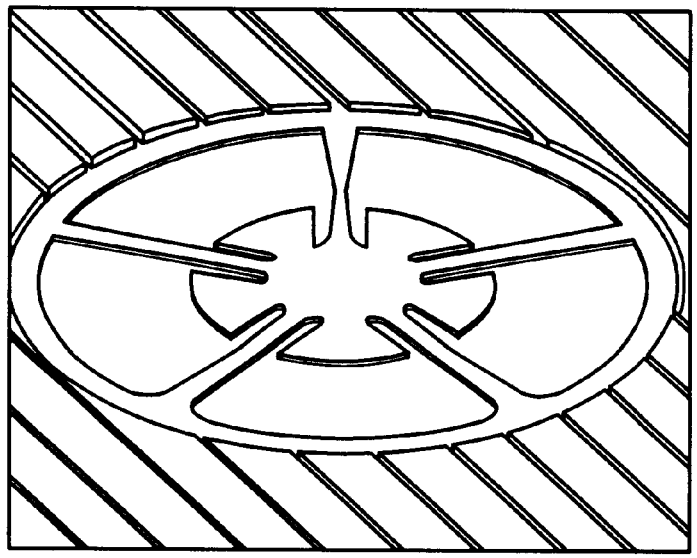
FIGS. 11A through 11C contain perspective pictorial images of three types of tether and membrane configurations in accordance with the present invention.
Figure 11B:
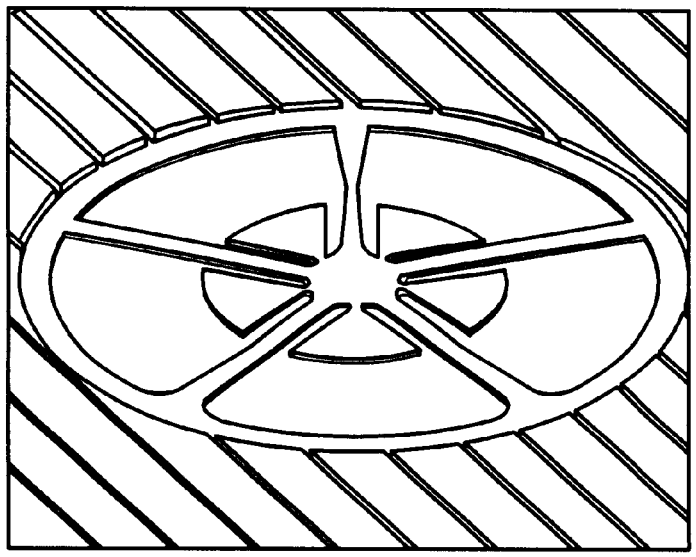
Figure 11C:
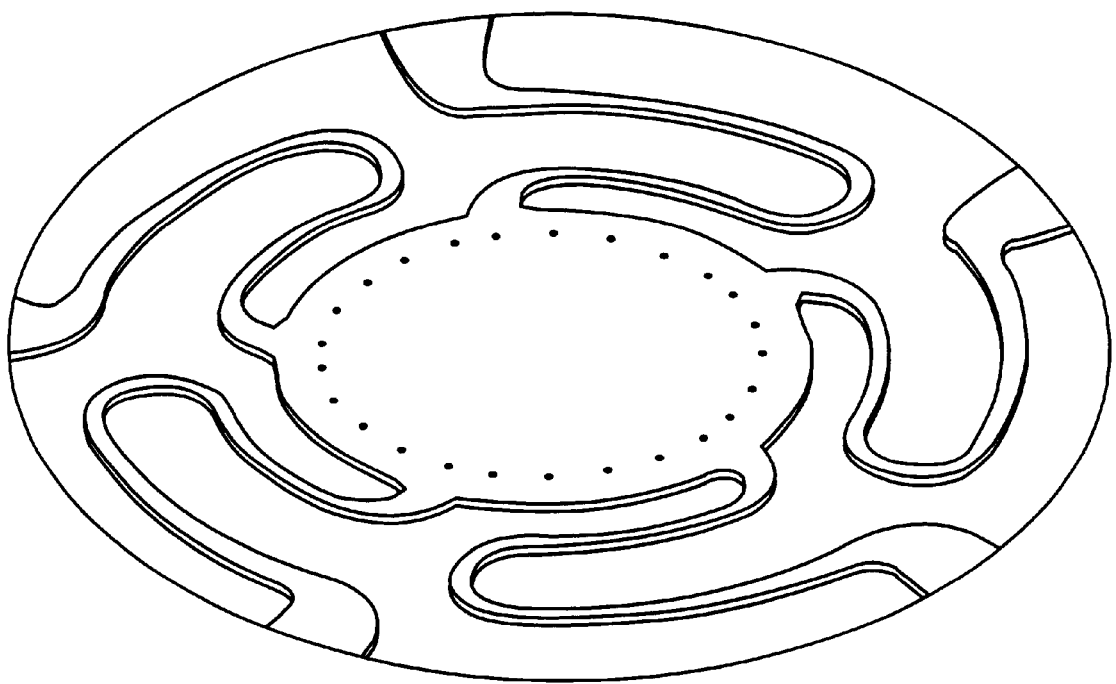

FIGS. 11A through 11C contain perspective pictorial images of three types of tether and membrane configurations in accordance with the present invention. FIGS. 11A and 11B illustrate two radial or straight tether configurations. FIG. 11C illustrates the loop configuration depicted in plan view in FIG. 3C.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A reflective surface for defining a cavity in an optical filter comprising:
   an outer body portion;
   an inner movable membrane portion within the outer body portion, the inner movable membrane portion being movable along an axis of the reflective surface; and
   a plurality of flexures connecting the body portion and the membrane portion, the plurality of flexures being formed in a substantially spiral pattern, each flexure comprising at least one curvilinear portion.

2. The reflective surface of claim 1 wherein the optical filter is a Fabry-Perot filter.

3. The reflective surface of claim 1 wherein the reflective surface is formed in a silicon-on-insulator device structure.

4. The reflective surface of claim 1 wherein the reflective surface is etched in a semiconductor material.

5. The reflective surface of claim 4 wherein the semiconductor material is silicon.

6. The reflective surface of claim 1 wherein the flexures form a swept spiral pattern.

7. The reflective surface of claim 1 wherein the flexures form a dogleg spiral pattern.

8. The reflective surface of claim 1 wherein the membrane portion is coated to prevent stiction attachment to an adjacent structure.

9. The reflective surface of claim 1 wherein the membrane portion is roughened to prevent stiction attachment to an adjacent structure.

10. An optical filtering method comprising:
    providing an input through which light enters an optical filter;
    providing an output through which filtered lights exits the optical filter;
    providing a cavity between the input and the output into which the light passes, said providing a cavity comprising providing a first reflective surface and a second reflective surface bounding the cavity, providing at least one of the first and second reflective surfaces comprising providing an outer body portion, an inner movable membrane portion within the outer body portion such that the inner movable membrane portion is movable along an axis of the optical filter, and a plurality of flexures connecting the body portion and the membrane portion, the flexures being formed in a substantially spiral pattern, each flexure comprising at least one curvilinear portion.

11. The method of claim 10 wherein the optical filter is a Fabry-Perot filter.

12. The method of claim 10 wherein the reflective surface is formed in a silicon-on-insulator device structure.

13. The method of claim 10 wherein the reflective surface is etched in a semiconductor material.

14. The method of claim 10 wherein the reflective surface is etched in silicon.

15. A tunable optical filter comprising:
    an input through which light can enter the filter;
    an output through which filtered light can exit the filter; and
    first and second reflective surfaces bounding an optical cavity between the input and the output into which the light passes, at least one of the first and second reflective surfaces being movable to change the length of the first cavity, the movable reflective surface comprising a movable membrane portion connected to an outer body portion by a plurality of flexures, the flexures having a substantially spiral pattern, each flexure comprising at least one curvilinear portion.

16. An optical filtering method comprising:
    providing an input through which light can enter a filter;
    providing an output through which filtered light can exit the filter; and
    providing first and second reflective surfaces bounding a cavity between the input and the output into which the light passes, at least one of the first and second reflective surfaces being movable along an axis of the device to change the length of the first cavity, the movable reflective surface comprising a movable membrane portion connected to an outer body portion by a plurality of flexures, the flexures having a substantially spiral pattern, each flexure comprising at least one curvilinear portion.

* * * * *